United States Patent [11] 3,611,148

[72] Inventor George H. L. Cox
Warwick, England
[21] Appl. No. 838,255
[22] Filed July 1, 1969
[45] Patented Oct. 5, 1971
[73] Assignee Serck Controls Limited
Queensway, Leamington Spa, England
Continuation-in-part of application Ser. No. 565,872, July 18, 1966, now abandoned.

[54] DATA TRANSMISSION SYSTEM FOR BINARY CODED DATA USING SINGLE FREQUENCY SHIFT OSCILLATOR

2 Claims, 4 Drawing Figs.

[52] U.S. Cl. .... 325/163, 178/66
[51] Int. Cl. .... H04l 27/12
[50] Field of Search .... 325/30, 163; 178/66

[56] References Cited

UNITED STATES PATENTS

| | | | |
|---|---|---|---|
| 3,454,718 | 7/1969 | Perreault | 178/66 |
| 3,223,925 | 12/1965 | Florac, Jr. et al. | 178/66 |
| 3,165,583 | 1/1965 | Kretzmer et al. | 178/66 |
| 3,142,723 | 7/1964 | Fleming | 178/66 A |
| 3,102,238 | 8/1963 | Bosen | 178/66 A |

*Primary Examiner*—Robert L. Griffin
*Assistant Examiner*—James A. Brodsky
*Attorney*—Holman & Stern

ABSTRACT: In a two frequency data transmission system for the transmission of binary coded data in the form of successive "marks" and "spaces," "marks" are represented by one frequency and "spaces" by a second frequency and each "-mark" or "space" consists of an integral number of cycles of its respective frequency, the number of cycles being the same for both, which number is preferably one.

Inventor

George H. L. Cox

By Holman, Glascock, Downing & Seebold

Attys.

DATA TRANSMISSION SYSTEM FOR BINARY CODED DATA USING SINGLE FREQUENCY SHIFT OSCILLATOR

This application constitutes a continuation-in-part of abandoned application Ser. No. 565,872 filed 18 July, 1966, for "Improvements in or relating to Data Transmission Systems." This invention relates to data transmission systems.

In a carrier transmitting system for the transmission of binary coded data, bursts of carrier frequency indicates the "-marks" and "spaces." The beginning and end of a burst is not related to the instantaneous phase of the carrier frequency so that the leading and trailing edges of the demodulated pulses contain an element of jitter according to the instantaneous phase of the carrier. Such jitter becomes more marked when the carrier frequency is not much higher than the modulating frequency. Like difficulties also occur in other than two frequency systems.

An object of the present invention is to provide a system which inter alia overcomes these difficulties.

According to the invention, there is provided a two-frequency data transmission system for the transmission of binary coded data in the form of successive "marks" and "-spaces," wherein a first carrier frequency represents the "-marks" and the second carrier frequency represents the "-spaces" and wherein the representation of each "mark" and each "space" in the transmitted signal is an integral number of cycles of its respective carrier frequency, the integer for the "-marks" being the same as that for the "spaces." Preferably the integral is one so that the modulating and modulated frequencies are the same.

With such an arrangement the leading and trailing edges of the pulses begin at the same instantaneous phase of the carrier. The waveforms are held tightly in phase resulting in a jitter-free system.

Optionally, parity check bits and/or word-terminating marks (address or reply) can be dispensed with for code checking i.e., for checking that the correct number of cycles — both mark and space — had been received. A start — marking bit may be sent to determine the start of a word after the buildup of the modulated wave had been completed. This applies specifically to the slow buildup technique adopted to prevent ringing on two wire circuits, and for changing direction of transmission on four wire circuits. An embodiment of the invention will now be described with reference, by way of example, to the accompanying drawings, in which:

Figure 1:
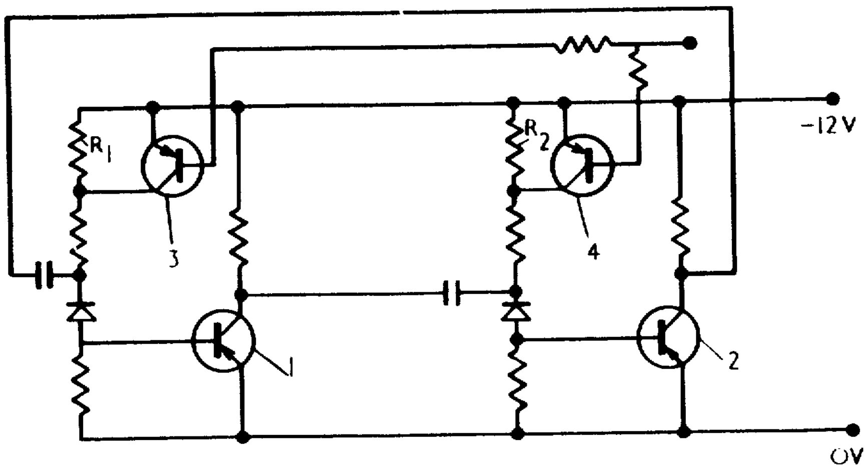
FIG. 1 is a circuit diagram of a frequency shift oscillator.

The frequency shift oscillator shown in FIG. 1 may be used in a two-frequency binary coded data transmitting system in which one frequency, the higher one, represents the "marks" and the other frequency, the lower one, represents the "-spaces." The oscillator provides a waveform with no discontinuity as the oscillator changes frequency. The oscillator comprises cross-coupled transistors 1 and 2 with appropriate time constants. These time constants include resistors $R_1$ and $R_2$ respectively shunted by transistors 3 and 4. The frequency of the oscillator is changed from its normal or rest frequency (i.e., corresponding to "space") by applying an appropriate switching signal to the bases of transistors 3 and 4 thereby effectively short-circuiting resistors $R_1$ and $R_2$ to produce the higher frequency (i.e., "mark"). In this way no abrupt switching discontinuity is introduced in the supply to transistors 1 and 2 and no interruption occurs in the generated waveform.

Figure 2:
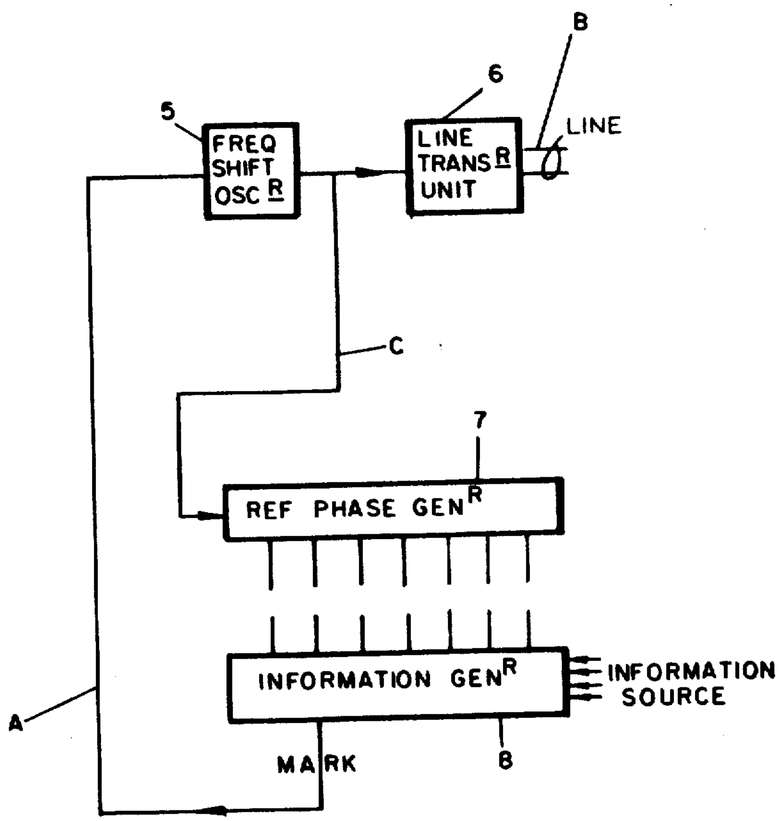
FIG. 2 is a block schematic diagram of a transmitter in accordance with the invention.

FIG. 2 shows a transmitter in which a frequency shift oscillator 5 is similar to that shown in FIG. 1. The output from oscillator 5 is fed to a line transmission unit 6 and also to a reference phase generator 7 closely coupled to an information generator 8 which receives the information to be transmitted, from an information source. Oscillator 5 in its unswitched state produces a frequency corresponding to "space" and therefore a switching signal is required for each "mark" to be transmitted. The switching signals are produced by information generator 8, the correct sequence of "marks" and "-spaces" being maintained by the stepping-on action of reference phase generator 7. The reference phase generator 7 is of the counter type, i.e., it 'steps on' in time; and its function is to provide the main timing signals for the system scan cycle.

Thus the information waveforms are built up as pulse train in terms of the series of 'P' or position pulses generated in the reference phase generator. The relative positions or phases of the P pulses are identified by the number — P suffix — given to them individually. Reference phase generator 7 steps-on at each in-phase waveform transition (equivalent to a specific pulse 'edge') of frequency shift oscillator 5 to which it is connected so that each single-cycle "bit" is started and stopped in step with the beginning and end of its appropriate cycle, assuming that the said integer of the coherent signal is one. If the integer is other than one a dividing counter is included in the connection between oscillator 5 and generator 7 or generator 7 is arranged to respond to the respective transitions according to the selected integer.

The information fed from the information source to information generator 8 consists of a number of words, each made up of a predetermined number of bits and each starting with a mark. The information generator 8 consists of a battery of stores which holds in parallel the information from the information sources for transmission in serial form in terms of the P sequence. Thus one side of each (bistable) store in the battery is fed from its, individual Reference Phase Generator P line. Consequently the information generator outputs (serialized by the action of the reference phase generator 7) are fed to the input of the shift oscillator 5 and the resultant sequence of cycles of the two frequencies which is fed to the line transmission unit 6 corresponds with the information from the information source. In this two-frequency system the spacings between the words as well as the space bit within the word are represented by the lower frequency. The stepping-on action of the reference phase generator, provides at the predetermined end of the information words, the word — terminating information but which is produced automatically at the end of the predetermined number of P pulses.

Figure 4:
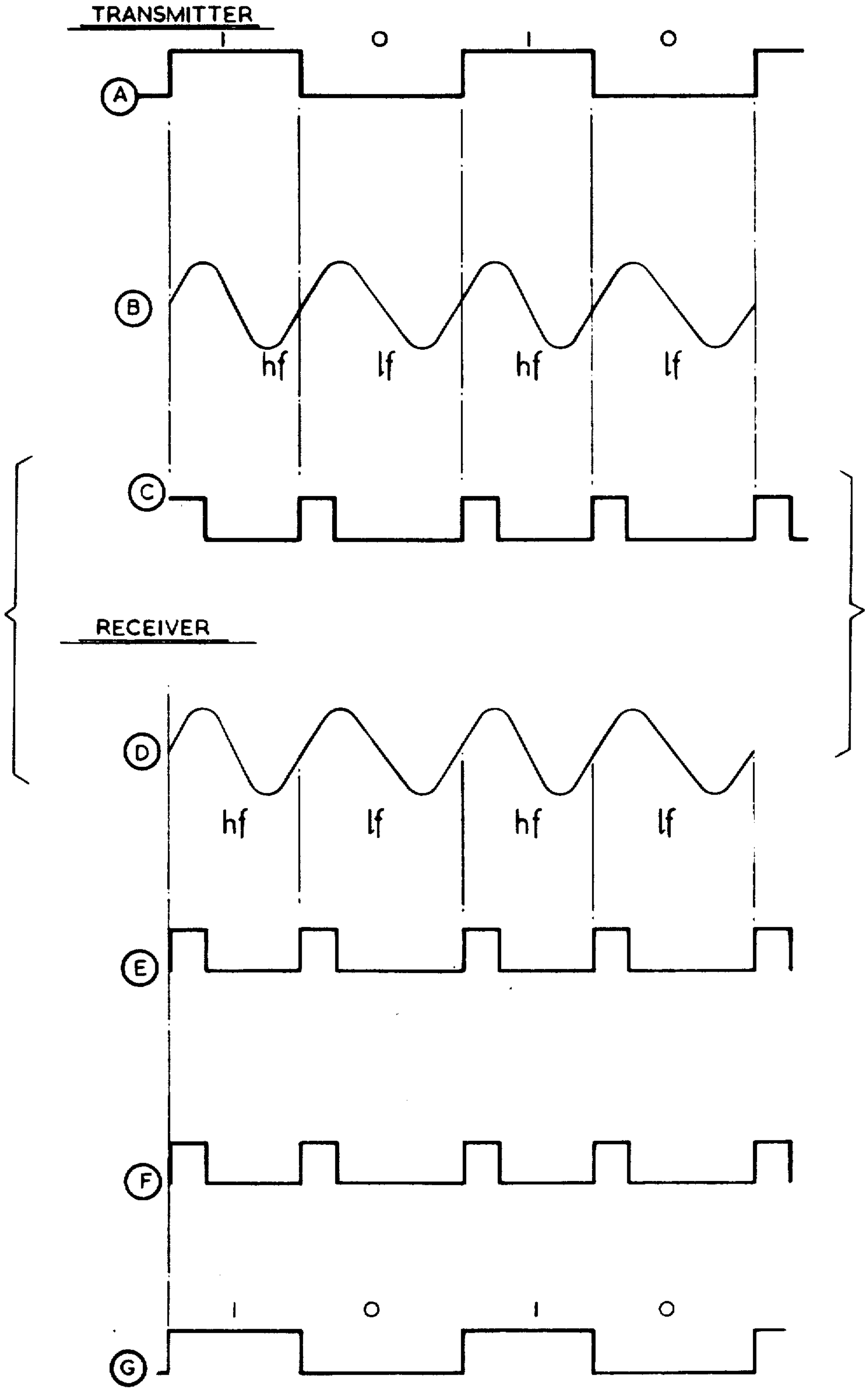
FIG. 4 is a waveform diagram showing waveforms at various points in FIG. 2 and FIG. 3.

The waveforms at points A, B & C are shown in FIG. 4 the word being transmitted being 1010.

Figure 3:
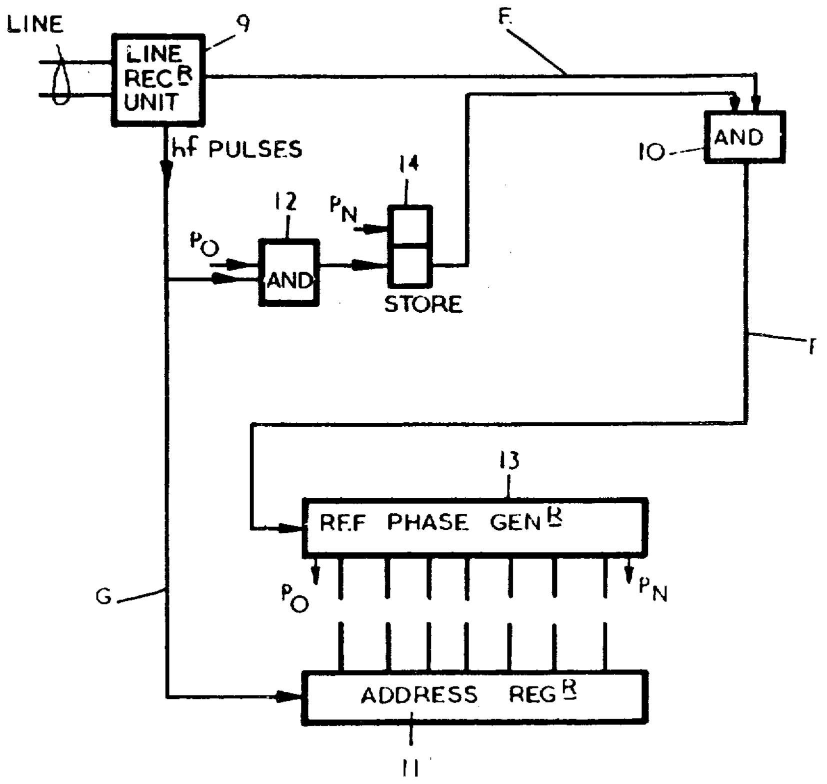
FIG. 3 is a block schematic diagram of a receiver in accordance with the invention.

FIG. 3 shows a receiver comprising a line receiver unit 9 in which the incoming signal is limited and squared, and the tone waveform is fed to AND gate 10. The incoming signal is demodulated to give HF pulses only, and these are fed to an address register 11 and AND gate 12.

The tone waveform from AND gate 10 is fed to a reference phase generator 13 which is similar to that described with reference to the transmitter. It comprises a counter having a rest position *Po* and a reset position *Pn*, the count corresponding to the predetermined number of bits in each word. Register 11 and generator 13 are closely coupled together as already described in relation to the reference phase generator 7 and information generator 8 of the transmitter. Address register 11 comprises a battery of stores so that each bit of incoming information is stored in its appropriate store position as determined by the reference phase generator P position.

Assuming that the receiver is in the rest condition with the lower frequency being received corresponding to the spacing between words and reference phase generator 13 set at *Po*. The beginning of a word is identified by a mark so that an HF pulse is received at AND gate 12 which because it has the condition Po at its other input passes a pulse to a store 14 which in turn opens AND gate 10 to reference phase generator 13 causing it to step-on with each cycle of the tone. At the same time the HF pulse is received at address register 11 and the position store as determined by the generator 13 is therefore identified as a mark. The counter in generator 13 steps-on to the position *Pn* and a pulse is passed to store 14, producing a blocking signal on AND gate 10; and finally generator 13 is restored to the rest position of $P_o$ in readiness for the next initial HF pulse. The information in the register 11 is at the same time cleared down. The register 11 is in fact a form of staticiser in that the information is fed into it serially and held in it in parallel form until cleared down.

The waveforms at points D to G are shown in FIG. 4.

What is claimed is:

1. A data transmission system for the asynchronous transmission of binary coded data from a data source, comprising means for determining whether each bit of data from the data source is a mark or a space, a frequency shift oscillator, means for smoothly changing the frequency of said oscillator between two predetermined frequencies to provide an output wherein each mark of data is represented by a single whole cycle of one of said frequencies and each space of data is represented by a single whole cycle of the other of said frequencies and means for storing and releasing the data to the frequency change means in timed relationship so that the transition from one said frequency to the other said frequency taking place at substantially the zero crossover point said frequency shift oscillator comprises a pair of transistors cross-coupled with time constant producing resistor and capacitors, the cross-coupling of each transistor including a resistor which is shunted by a respective further transistor and the bases of the two further transistors having applied thereto switching signals to change the frequency of said oscillator between said two frequencies.

2. A data transmission system as claimed in claim 1 wherein said means for storing and releasing the data to the frequency change means in timed relationship comprises a reference phase generator closely coupled to an information generator which receives the information to be transmitted, the reference phase generator being connected to said oscillator to receive timing pulses therefrom, and the output of said information generator providing said switching signals.